US012619953B2

(12) United States Patent
Jain et al.

(10) Patent No.: US 12,619,953 B2
(45) Date of Patent: May 5, 2026

(54) ARTIFICIAL INTELLIGENCE (AI)-DRIVEN STANDARDIZED INTAKE TOOL

(71) Applicant: Truist Bank, Charlotte, NC (US)

(72) Inventors: Nishank Jain, Atlanta, GA (US); Christopher Alan Wix, Acworth, GA (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/932,707

(22) Filed: Oct. 31, 2024

(65) Prior Publication Data

US 2026/0120055 A1 Apr. 30, 2026

(51) Int. Cl.
*G06Q 10/10* (2023.01)

(52) U.S. Cl.
CPC ..................................... *G06Q 10/10* (2013.01)

(58) Field of Classification Search
CPC ....................................................... G06Q 10/10
See application file for complete search history.

(56) References Cited

U.S. PATENT DOCUMENTS

| | | | | |
|---|---|---|---|---|
| 11,983,094 | B2 * | 5/2024 | Downie | .............. G06F 11/3698 |
| 2021/0224818 | A1 * | 7/2021 | Choudhary | ........... G06F 40/284 |
| 2025/0068993 | A1 * | 2/2025 | Hoel | ................. G06Q 10/0631 |

* cited by examiner

*Primary Examiner* — Reginald R Reyes
(74) *Attorney, Agent, or Firm* — Kilpatrick Townsend & Stockton LLP; Michael A. Springs, Esq.

(57) ABSTRACT

The disclosed techniques pertain to artificial intelligence (AI) techniques. Particularly, techniques are disclosed for providing an AI-driven standardized intake tool. An intake request can be accessed and processed using a plurality of computational models to generate a set of results. The set of results and a machine-learning model can be used to predict a set of workflow actions for the intake request and a set of tools for an entity associated with the intake request can be updated based on the set of workflow actions. Updating the set of tools for the entity can initiate a workflow for incorporating a target of the intake request within the entity.

20 Claims, 4 Drawing Sheets

502 ONE OR MORE PROCESSORS

504 ONE OR MORE MEMORIES

506 RAM

508 COMM. INTERFACE

510 USER INTERFACE

COMPUTING SYSTEM

500

ARTIFICIAL INTELLIGENCE (AI)-DRIVEN STANDARDIZED INTAKE TOOL

FIELD

The present disclosure relates generally to artificial intelligence techniques, and more particularly, to techniques for providing an AI-driven standardized intake tool.

BACKGROUND

Large and complex organizations such as business enterprises are often organized into sub-enterprises such as departments, teams, divisions, and the like. These sub-enterprises are often responsible for performing one or more work requests and/or tasks that contribute to the functioning of the organization. For example, an account management division of an organization may be responsible for managing customer accounts and internal accounts. In another example, an application department may be responsible for managing applications for running the business enterprise and client-facing applications. As part of their responsibilities, sub-enterprises of the organization often coordinate processes such as work request intake or rollout of applications, services, and capabilities with other sub-enterprises of the organization. For example, in the case of a financial services organization, intake of a digital payment service by a banking department of the organization may involve coordination with an Automated Clearing House (ACH) API of the account management division of the organization. In another example, in the case of a retail enterprise, a work request in support of rollout of an inventory control database may involve coordination with a customer management department. Often intake within an organization involves coordination between sub-enterprises using disparate intake processes of the individual sub-components of the organization. Therefore, it may be desirable to provide a tool for standardizing intake.

BRIEF SUMMARY

Techniques disclosed herein pertain to artificial intelligence (AI) techniques. Particularly, techniques are disclosed herein for providing an AI-driven standardized intake tool.

In some embodiments, a computer-implemented method includes: accessing an intake request, the intake request corresponding to an application to be incorporated within an entity; processing the intake request using a plurality of computational models, wherein processing the intake request using the plurality of computational models causes the plurality of computational models to generate a set of results; using the set of results and a machine-learning model to predict a set of workflow actions for the intake request; and updating a set of tools for the entity based on the set of workflow actions, wherein updating the set of tools for the entity initiates a workflow for incorporating the application within the entity.

In some embodiments, at least one computational model of the plurality of computational models comprises a rule-based model.

In some embodiments, the processing the intake request using the plurality of computational models comprises updating the rule-based model with a rule derived from data and information associated with the intake request that is collected during the processing.

In some embodiments, at least one computational model of the plurality of computational models comprises a machine-learning model.

In some embodiments, the processing the intake request using the plurality of computational models comprises fine-tuning the machine-learning model with data and information associated with the intake request that is collected during the processing.

In some embodiments, the method further includes using the set of results to generate one or more visualizations for the intake request.

In some embodiments, the one or more visualizations comprises a Gantt chart depicting a workflow associated with the set of workflow actions.

Some embodiments include a system that includes one or more processors and one or more computer-readable media storing instructions which, when executed by the one or more processors, cause the system to perform part or all of the operations and/or methods disclosed herein.

Some embodiments include one or more non-transitory computer-readable media storing instructions which, when executed by one or more processors, cause a system to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
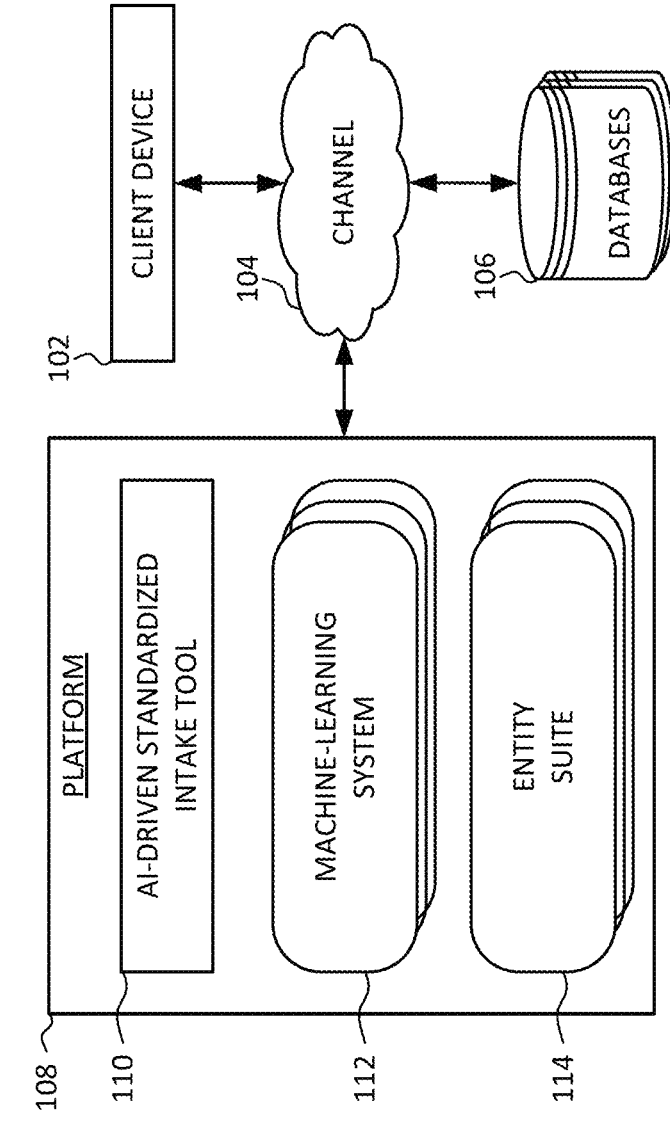
FIG. 1 is a simplified diagram of an example environment for providing an artificial intelligence (AI)-driven standardized intake tool, according to some embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Large and complex organizations such as business enterprises often improve their functioning by using intake processes such as work request processes for introducing new applications, services, and capabilities and/or by upgrading or deprecating existing applications, services, and capabilities. Traditional intake processes often rely on non-standardized disparate sub-intake processes and are technically challenged. For example, in the case of a financial services organization, intake of a digital payment service by a banking department may involve a team member of the digital payment service team filling out an electronic form of an Automated Clearing House (ACH) API team, accessing a database to research the dependencies of another team such as an applications teams, waiting for resource permission access to be granted by the ACH API team, and then coordinating with a scheduling program unique to the digital payment service team to complete the intake. In another example, in the case of a retail organization, rollout of an inventory control database may involve product lifecycle coordination with a product management software, financial coordination with the business development software, coordinating with the deployment software for enterprise applications, and so on. Relying on these disparate intake processes is often costly in terms of time resources, human resources, and financial resources. Additionally, due to the technical processes involved with each of the respective intake processes, efficiency of the organization suffers, which in turn may lead to degraded performance and even failure of the intake and/or the organization.

The techniques described herein overcomes these challenges and others by providing an artificial intelligence (AI)-driven standardized intake tool. The AI-driven standardized intake tool described herein overcomes these challenges and others by processing intake requests using computational models including rule-based models and machine-learning models to provide a standardized and unified intake experience across sub-components and sub-entities of an entity. The techniques described herein provide a technical computational solution to the technical problems associated with the traditional intake processes. As such, using the techniques described herein consumption of resources by the entity such as time resources, human resources, and financial resources can be reduced and efficiency of the operation of the entity can be increased.

In various embodiments, a computer-implemented method includes: accessing an intake request, the intake request corresponding to an application to be incorporated within an entity; processing the intake request using a plurality of computational models, wherein processing the intake request using the plurality of computational models causes the plurality of computational models to generate a set of results; using the set of results and a machine-learning model to predict a set of workflow actions for the intake request; and updating a set of tools for the entity based on the set of workflow actions, wherein updating the set of tools for the entity initiates a workflow for incorporating the application within the entity.

FIG. 1 shows a simplified diagram of an example environment for providing an AI-driven standardized intake tool. As shown in FIG. 1, the environment 100 includes a client device 102, a channel 104, a platform 108, and one or more databases 106 (hereinafter "databases 106"). The platform 108 can be configured to communicate with, send data and information to, and receive data and information from the client device 102 via the channel 104. Additionally, the platform 108 can be configured to access the databases 106 to retrieve data and information from the databases 106 and/or store data and information in the databases 106. Data and information received from the client device 102 and the databases 106 can be used by the platform 108 to perform intake, work requests, tasks, services, and the like. While FIG. 1 shows the databases 106 as being separate from the platform 108, this is not intended to be limiting, and one or more of the databases 106 can be included as part of the platform 108.

The client device 102 can be any kind of electronic device that is capable of: executing applications; presenting information textually, graphically, and audibly such as via a display and a speaker; collecting information via one or more sensing elements such as image sensors, microphones, tactile sensors, touchscreen displays, and the like; connecting to a channel such as the channel 104 and/or a network such as a wireless network, wired network, a public network, a private network, and the like, to send and receive data and information; and/or storing data and information locally in one or more storage mediums of the electronic device and/or in one or more locations that are remote from the electronic device such as a cloud-based storage system, the platform 108, and/or the databases 106. Examples of electronic devices include, but are not limited to mobile phones, desktop computers, portable computing devices, computers, workstations, laptop computers, tablet computers, and the like. In some implementations, the client device 102 can be implemented according to the computing system 400 shown in FIG. 4.

In some implementations, an application can be installed on, executing on, and/or accessed by the client device 102. The application and/or a user interface of the application can be utilized and/or interacted with (e.g., by an end user) to access, utilize, and/or interact with one or more applications, services, capabilities provided by the platform 108. The client device 102 can be configured to receive multiple forms of input such as touch, text, voice, and the like, and the application can be configured to send data representing that input to the platform 108 using the channel 104. For example, an end user of the client device 102 can use a graphical user interface of an intake application to generate an intake request and the client device 102 can send data representing the intake request to the platform 108 using the channel 104. Additionally, the client device 102 can be configured to receive data and information from the platform 108 using the channel 104 and the intake application can be configured to present and/or render the received messages, data, and information in one or more user interfaces of the intake application. For example, in response to receiving the data representing the intake request, the platform 108 can process the intake request, predict one or more proposed actions for the intake request and/or generate one or more visualization for the intake request, and send the one or more proposed actions and/or visualizations to the client device 102 for presentation to the end user.

The channel 104 can be any kind of channel that is capable of facilitating communication and the transfer of data and/or information between one or more entities such as the client device 102, the databases 106, and the platform 108. Examples of channels include, but are not limited to, public networks, private networks, the Internet, wireless networks, wired networks, fiber optic networks, local area networks, wide area networks, and the like. The channel 104 can be configured to facilitate the transfer of data and/or information between and among the one or more entities using any suitable communication protocol.

Each database included in the databased 106 can be any kind of database that is capable of storing data and/or information and managing data and/or information. Data and/or information stored by each database can include data and/or information generated by, provided by, and/or otherwise obtained by the platform 108. Additionally, or alternatively, data and/or information stored and/or managed by each database included in the databases 106 can include data and/or information generated by, provided by, and/or otherwise obtained by other sources such as the client device 102. One or more databases that are included in the databases 106 can be part of a platform for storing and managing organization information of an enterprise such as a configuration management database (CMDB).

The platform 108 can be a computing platform/system of and/or hosted by an entity such as an organization, enterprise, unincorporated associated, business association, a company, and the like. The platform 108 can be configured to include various applications and capabilities and provide various services to end users of the platform 108 such as processing intake requests for the entity. As shown in FIG. 1, the platform 108 can include an AI-driven standardized intake tool 110, a machine-learning system 112, and an entity suite 114.

The intake tool 110 is configured to process intake requests and generate intake request responses for the intake requests. The intake request responses can include proposed actions that are predicted for the intake requests and/or visualizations that are generated for the intake requests. The intake tool 110 is configured to process intake requests using machine-learning models provided by the machine-learning system 112 and data, information, and tools included in the entity suite 114. The intake tool 110 can be configured to provide the proposed actions and the visualizations to the client device 102, the entity suite 114, and/or the platform 108 for presentation and/or further processing.

The machine-learning system 112 is configured to build, train, fine-tune, and deploy machine-learning models for use by the platform 108. The machine-learning system 112 can build, train, fine-tune, and deploy any kind of machine-learning model. Examples of such machine-learning models include, but are not limited to, supervised learning models such as decision trees, unsupervised learning models such as hierarchical clustering, semi-supervised learning models, reinforcement learning models, deep learning models such as generative adversarial networks, and transformer models such as generative pre-trained transformers. The machine-learning system 112 can build, train, and fine-tune machine-learning models using any suitable hyperparameter optimization techniques, model training techniques, and model fine-tuning techniques. Additionally, the machine-learning system 112 can be configured to employ any suitable preference tuning and/or alignment techniques to refine the machine-learning models.

One or more the machine-learning models provided by the machine-learning system 112 can be used process intake requests received by the intake tool 110. For example, upon receiving an intake request, the intake tool 110 can call one or more machine-learning models provided by the machine-learning system 112 to process the intake request to predict one or more proposed actions for the intake request and/or generate one or more visualization for the intake request and send the one or more proposed actions and/or visualizations to the client device 102, the entity suite 114, and/or the platform 108 for presentation and/or further processing. While FIG. 1 shows the machine-learning system 112 as being part of the platform 108, this is not intended to be limiting, and the machine-learning system 112 and one or more machine-learning models used by the intake tool 110 and the platform 108 can be separate from and accessed by the intake tool 110 and the platform 108. For example, the machine-learning system 112 can access a machine-learning model using channel 104 and provide that access to the intake tool.

Machine-learning models provided by the machine-learning system 112 can be configured to predict, obtain, generate, and/or retrieve one or more results in response to one or more inputs such as one or more vectors, matrices, prompts, and the like. The inputs for the machine-learning models can be obtained from or generated by or retrieved from or accessed from the client device 102, the databases 106, the platform 108, and/or one or more other sources such as the Internet. Each input can be configured to cause a respective machine-learning model to make one or more predictions, obtain information, generate a result, retrieve information, perform one or more tasks, and the like. Inputs for machine-learning model can be pre-generated (i.e., before they are needed) and/or generated in real-time (i.e., as they are needed for a particular task). In some implementations, inputs for the machine-learning models can be engineered (e.g., by the machine-learning system 112) to achieve a desired result or results. In some implementations, inputs for the machine-learning models can be engineered one demand (i.e., in real-time and/or as needed) and/or at particular intervals (e.g., once per day, upon log in by an end user into the platform 108 and/or client device 102).

Figure 2:
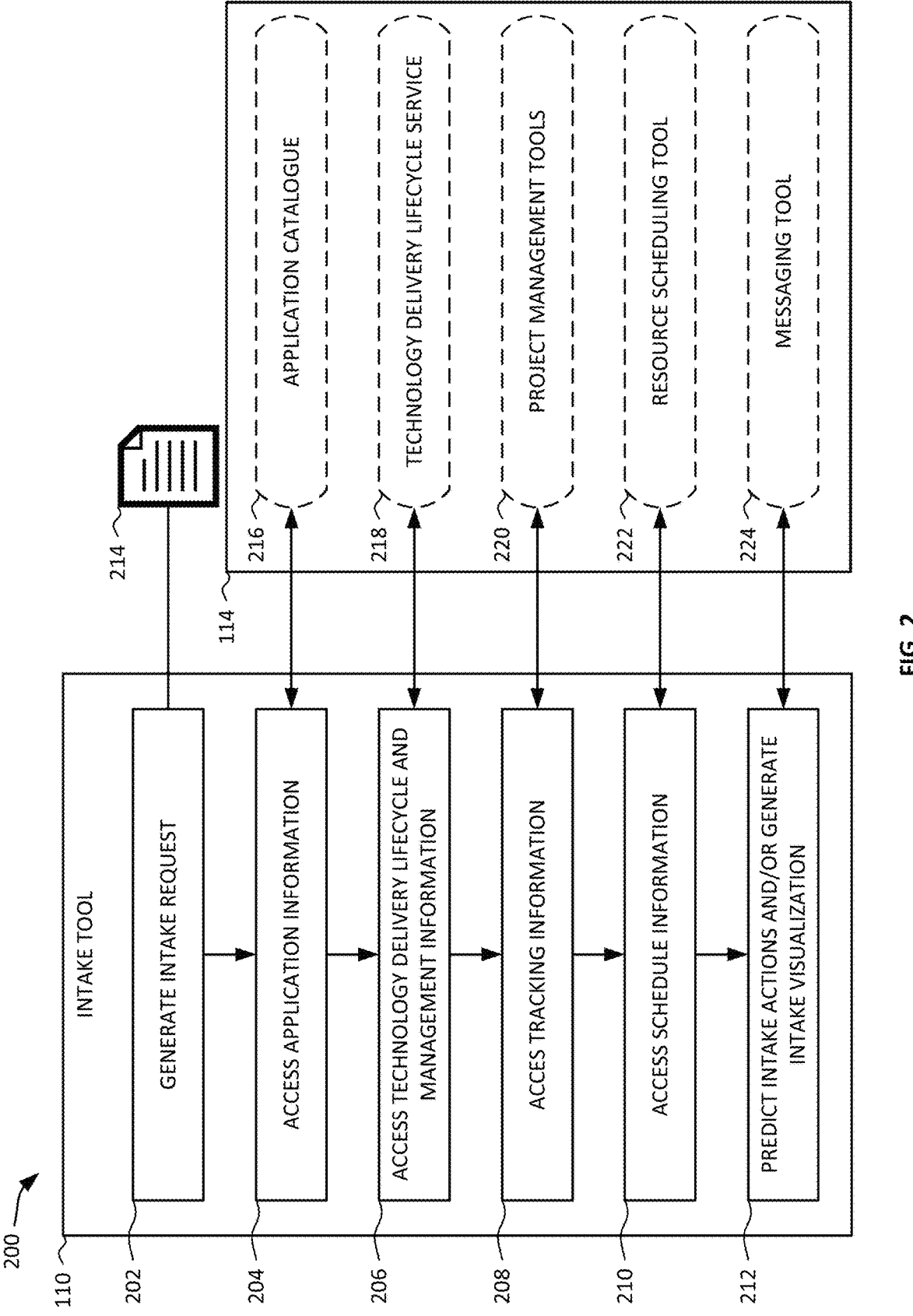
FIG. 2 is a simplified diagram of an example flow of the AI-driven standardized intake tool, according to some embodiments.

The entity suite 114 includes applications, services, tools, and the like that are used by the entity to facilitate operation and management of the entity. As shown in FIG. 2, examples of applications, services, tools, and the like that may be included in the entity suite 114 include an application catalogue 216, a technology delivery lifecycle service 218, project management tools 220, resource scheduling tool 222, and a messaging tool 224. The application catalogue 216 may be configured to store application information about applications utilized and/or employed by the entity. Example of such information include, but are not limited to, applications serving and/or employed by the entity, tier ratings for the applications, relationships between the applications, the sub-entit(ies) of the entity that host/manage the applications, and the like. In some implementations, the application catalogue 216 can be implemented as a configuration management database (CMDB) that includes a plurality of configuration items, where each configuration item of the plurality of configuration items stores information about a particular application of the applications utilized and/or employed by the entity. The technology delivery lifecycle service 218 may be configured to provide technology delivery and lifecycle management workflow services for the entity and generate technology delivery and lifecycle management information documenting the workflow services. Examples of workflow services include, but are not limited to, a service that aligns a particular technology deliverable to a suitable application team, a service that assigns a rating for the technology deliverable, a service that assigns a workflow to deliver and/or manage a lifecycle of a technology deliverable, and the like. The project management tools 220 may be configured to provide tools for implementing the workflow services provided by the technology delivery lifecycle service 218 and generating tracking information for tracking statutes of the workflow services provided by the technology delivery lifecycle service 218. In some implementations, the tools may include tools for organizing and tracking tasks, schedules, resources, budgets, costs, risks, issues, dependencies, decisions, and the like. The resource scheduling tool 222 may be configured to access and manage calendars and schedules for teams of the entity and team members of each team. The resource scheduling tool 222 can be configured to enter, manage, and/or retrieve schedule information, and the like for appointments/meetings in the calendars and schedules for teams of the entity and team members of each team. The messaging tool 224 may be configured to generate, access, and manage messages for teams of the entity and team members of each team. Examples of messages include messages communicating the one or more proposed actions predicted for an intake request and/or one or more visualizations generated for the intake request. In some implementations, the messaging tool 224 may be configured to send the messages including one or more proposed actions and/or visualizations to the client device 102 for presentation to the end user.

FIG. 2 is a simplified diagram of an example flow of the AI-driven standardized intake tool. As shown in FIG. 2, the AI-driven intake tool 110 can be configured to: (i) generate an intake request 202 using received, retrieved, obtained, and/or accessed intake request information 214; (ii) access the application information 204 provided by the application catalogue 216; (iii) access the technology delivery lifecycle information 206 provided by the technology delivery lifecycle service 218; (iv) access the project information 208 provided by the project management tools 220; (v) access schedule information 210 provided by resource scheduling tool 222; and (vi) using one or more models machi predict intake actions and/or generate intake visualization for the intake request and use the messaging tool 224 to communicate information regarding the predicted intake actions and/or the visualizations to impacted teams and/or team members of the impacted teams.

Although not shown, the platform 108 can include other applications, tools, systems, suites, capabilities, services, and the like. Additionally, or alternatively, while FIG. 1 shows the intake tool 110, the machine-learning system 112, and the entity suite 114 as being separate components, one or more of these components can be combined with other applications, tools, systems, suites, capabilities, services, and the like. The environment 100 depicted in FIG. 1 is merely exemplary and is not intended to unduly limit the scope of disclosed techniques. One of ordinary skill in the art would recognize many possible variations, alternatives, and modifications.

Figure 3:
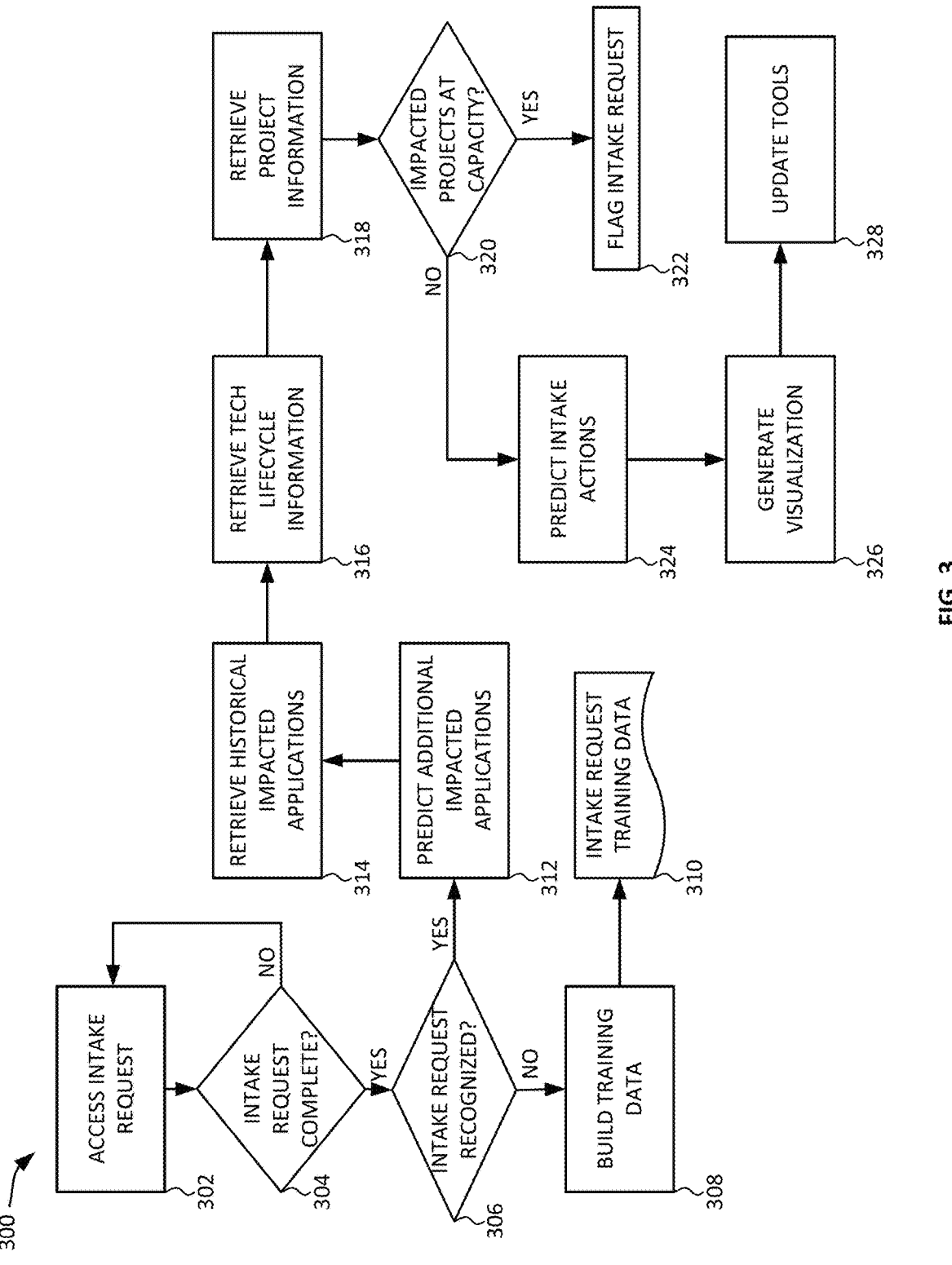
FIG. 3 depicts an example of a flow for processing an intake request using the AI-driven intake tool, according to some embodiments.

FIG. 3 depicts an example of a flow 300 for processing an intake request using the AI-driven intake tool. The flow depicted in FIG. 3 may be implemented in software (e.g., code, instructions, program) executed by one or more processing units (e.g., processors, cores) of the respective systems, hardware, or combinations thereof. The software may be stored on one or more non-transitory storage media (e.g., on a memory device). The flow shown in FIG. 3 and described below is intended to be illustrative and non-limiting. Although FIG. 3 depicts the various steps occurring in a particular sequence or order, this is not intended to be limiting. In certain alternative embodiments, the steps may be performed in some different order or some steps may also be performed in parallel. In certain embodiments, such as in the embodiments depicted in FIGS. 1 and 2, the flow shown FIG. 3 may be performed by the platform 108 and/or the AI-driven standardized intake tool 110.

At block 302, an intake request is accessed. In some implementations, the intake request can be an intake request that is generated using intake request information such as the intake request information 214. In some implementations, the intake request information can be provided by a client device such as the client device 102. In some implementations, the intake request can describe an intake process such as work request process for introducing one or more new applications, services, and capabilities and/or by upgrading or deprecating one or more existing applications, services, and capabilities. In some implementations, the intake request can include a description of the intake request that identifies a type for the intake request, a target team for the intake request, and applications expected to be impacted by the intake request.

At block 304, a check is made as to whether the intake request is complete. The check as to whether the intake request is complete can be made using a rule-based model. The rule-based model can be utilized to determine whether the intake request identifies an intake type for the intake request, identifies a target team for the intake request, and identifies the applications that are expected to be impacted by the intake request. An intake request can be determined to be incomplete by the rule-based model in the event it does not include an intake type for the intake request, a target team for the intake request, or applications that are expected to be impacted by the intake request. In the event the intake request identifies the intake type for the intake request, the target team for the intake request, and the applications expected to be impacted by the intake request, the intake request can be determined to be complete and the flow 300 can proceed to block 306. In the event that it is determined that the intake request is incomplete, the flow 300 returns to block 302. Data and information collected at block 304 can be used to improve the rule-based model (e.g., to generate new rules and/or revise existing rules).

At block 306, a check is made as to whether the intake request is recognized. The check as to whether the intake request is recognized can be made using a machine-learning model such as a machine-learning model provided by the machine-learning system 112. The machine-learning model can be utilized to predict whether the intake type for the intake request corresponds to the target team for the intake request and the applications expected to be impacted by the intake request. An intake request can be determined to be unrecognizable by the machine-learning model in the event it that the intake type for the intake request does not correspond to the target team for the intake request and the applications that are expected to be impacted by the intake request. In the event that the intake request is recognized, the flow 300 proceeds to block 310. In the event that that the intake request is not recognized, the flow 300 proceeds to block 308.

Data and information collected at block 306 can be used to train, fine-tune, and/or otherwise improve the machine-learning model used to recognize the intake request. For example, at block 308, the data and information collected at block 306 can be used to build training data resulting in intake request training data 310 which can be used to train, fine-tune, preference align, optimize, and/or otherwise improve the machine-learning model used to recognize the intake request.

At block 312, additional impacted applications are predicted. In some implementations, the additional impacted applications can be predicted by a machine-learning model such as a machine-learning model provided by the machine-learning system 112. The machine-learning model can accept the intake request as an input, process the intake request, and generate an output that includes a prediction as to what additional applications (e.g., additional to those included in the intake request) that are deployed within and/or used by the entity may be impacted by the intake request. In some implementations, the machine-learning model can be trained with data representing example intake requests and example impacted applications. As such, the machine-learning model can be configured to predict additional impacted applications. Data and information collected at block 312 can be used to train, fine-tune, and/or otherwise improve the machine-learning model used to predict the additional impacted applications.

At block 314, historical impacted applications are retrieved. In some implementations, the historical impacted applications are retrieved by a rule-based model. The rule-based model can accept the intake request as an input, access a historical record of intake requests and applications impacted such as a record in the CMDB of the databases 106 and/or acquire a historical record of intake requests and applications impacted from the technology delivery life-cycle service 218, and generate an output that includes a list of applications that have been previously impacted by intake requests having a same type as the intake request accessed at block 302 and provided to the rule-based model. Data and information collected at block 314 can be used to improve the rule-based model (e.g., to generate new rules and/or revise existing rules).

At block 316, technology delivery lifecycle and management information is retrieved. In some implementations, the technology delivery lifecycle and management information is retrieved by a rule-based model. The rule-based model can accept the intake request along with the applications impacted by the intake request (e.g., those included in the intake request and those predicted at block 312), access technology delivery lifecycle and management information such technology delivery lifecycle and management information from the technology delivery lifecycle service 218, and generate an output that includes technology delivery lifecycle and management information that is relevant to the intake request. For example, the technology delivery life-cycle and management information that is relevant to the intake request can include, but is not limited to, a particular service that aligns a technology deliverable associated with the intake request to a suitable application team, a service that assigns a rating for the technology deliverable, a service that assigns a workflow to deliver and/or manage a lifecycle of the technology deliverable, and the like. Data and infor-mation collected at block 316 can be used to improve the rule-based model (e.g., to generate new rules and/or revise existing rules).

At block 318, project information is retrieved. In some implementations, the project information is retrieved by a rule-based model. The rule-based model can accept the intake request along with the applications impacted by the intake request (e.g., those included in the intake request and those predicted at block 312) and the technology delivery lifecycle and management information and generate an output that includes project information that is relevant to the intake request. For example, the project information that is relevant to the intake request can include, but is not limited to, tracking information for tracking statutes of the workflow services provided by technology delivery lifecycle and management information. Data and information col-lected at block 318 can be used to improve the rule-based model (e.g., to generate new rules and/or revise existing rules).

At block 320, a check is made as to whether the impacted projects are at capacity. The check as to whether the impacted projects are at capacity can be made using a rule-based model. The rule-based model can be utilized to determine whether the project information retrieved at block 318 indicates that the impacted projects are at capacity. To determine whether the project information indicates that the impacted projects are at capacity, the rule-based model can compare schedule information for the impacted projects such as schedule information provided by the resource scheduling tool 222 to the schedules included in the project information. The impacted projects can be determined to be at capacity in the event the schedule information does not align or allow for the schedules included in the project information to be included in the schedule information (e.g., for the projects of the intake request to be scheduled given the schedules for other projects). In the event the impacted projects are at capacity, the flow 300 can proceed to block 322 where the intake request is flagged such that it may be proceed at a later time and/or modified. In the event that it is determined that the impacted projects are not at capacity, the flow 300 proceeds to block 324. Data and information collected at block 320 can be used to improve the rule-based model (e.g., to generate new rules and/or revise existing rules).

At block 324, intake actions for the intake request are predicted. In some implementations, the intake actions can be predicted by a machine-learning model such as a machine-learning model provided by the machine-learning system 112. The machine-learning model can accept the intake request along with the data and information collected while the flow 300 is being performed as an input, process the intake request and the data and information, and generate an output that includes a prediction as to what actions need to be taken to implement the intake of the intake request. The actions can include, but are not limited to, scheduling actions, messaging actions, notification actions, workflow planning actions, technology deployment and management actions, project management actions, team management actions, and the like. For example, the actions can include scheduling a meeting for the intake request, inviting required attendees identified while the flow 300 is being performed, and distributing a message that describes the intake request to the impacted teams. Data and information collected at block 320 can be used to train, fine-tune, and/or otherwise improve the machine-learning model used to predict the actions.

At block 326, one or more visualizations can be generated for the intake request. In some implementations, the one or more visualization can be predicted by a machine-learning model such as a machine-learning model provided by the machine-learning system 112. The machine-learning model can accept the intake request along with the predicted intake actions and generate one or more visualizations for the intake request. Each visualization of the one or more visu-alizations can describe or provide a visualization of a predicted action. For example, in the case that the predict actions include a predicted workflow for implementing the intake request, a visualization can be Gannt chart showing the workflow. Data and information collected at block 312 can be used to train, fine-tune, and/or otherwise improve the machine-learning model used to predict the additional impacted applications.

At block 328, tools can be updated. Examples of tools that can be updated include, project management tools such as the project management tools 220, resource scheduling tools such as the resource scheduling tool 222, messaging tools such as the messaging tool 224. The tools can be updated with the predicted actions and the one or more visualizations generated. For example, in the case of the project manage-ment tool, the project management tool can be provided with the Gannt chart for the intake request. As such, the Gannt chart can form part of the project information provided for other intake requests. In another example, in the case of the messing tool, the messaging tool can be provided with meeting information for the intake request. As such, the messaging tool can manage communications based on the meeting information.

While not shown, data and information collected while the flow 300 is performed can be used to continuously improve the rule-based models and machine-learning models used by the flow 300. For example, in the case of rule-based models, data and information collected while the flow 300 is being performed can be used (e.g., (by the platform 108) to generate new rules and/or modify existing rules. In another example, in the case of machine-learning models, data and information collected while the flow 300 is being performed can be used (e.g., by the machine-learning system 112) to train, fine-tune, and/or otherwise improve the machine-learning models.

Figure 4:
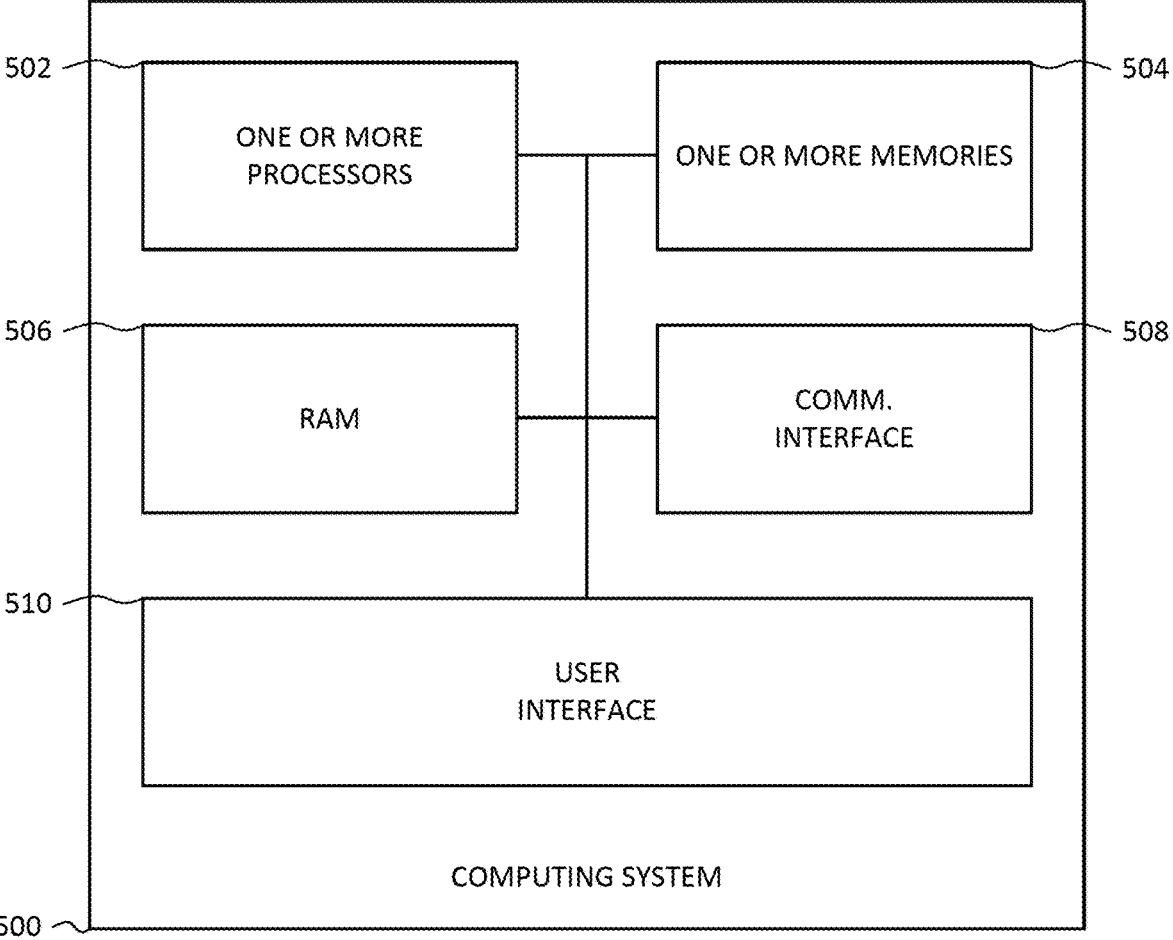
FIG. 4 is a simplified block diagram illustrating a computing system, according to some embodiments.

FIG. 4 shows an example of a computing system 400. The computing system 400 can be configured to implement or serve as the platform 108 and/or the AI-driven standardized intake tool 110 shown in FIGS. 1 and 2. The computing system 400 can be implemented as an electronic device such as a smartphone, a wearable device, a tablet computer, a workstation, desktop computer, server, and the like. As shown in FIG. 4, the computing system 400 can include one or more processors 402, one or more memories 404, RAM 406, comm. interface 408, and user interface 410.

The one or more processors 402 can read one or more programs from the one or more memories 406 and execute them using RAM 406. Each of the one or more processors 402 can be of any type including but not limited to a microprocessor, a microcontroller, a graphical processing unit, a digital signal processor, an application-specific integrated circuit (ASIC), a field programmable gate array (FPGA), or any combination thereof. In some implementations, the one or more processors 402 can include a plurality of cores, a plurality of arrays, one or more coprocessors, and/or one or more layers of local cache memory. The one or more processors 402 can execute one or more programs stored in the one or more memories 404 to perform the operations and/or methods, including parts thereof, described herein. Examples of such operations and/or methods can include any of the operations and/or methods described above with respect to FIGS. 1-3. In some examples, the one or more programs can include processor-specific instructions generated by a compiler or an interpreter from code written in any suitable computer-programming language, such as C, C++, C#, Python, or Java.

Each of the one or more memories 404 can be non-volatile and can include any type of memory device that retains stored information when powered off. Non-limiting examples of memory include electrically erasable and programmable read-only memory (EEPROM), flash memory, or any other type of non-volatile memory. At least one memory of the one or more memories 404 can include a non-transitory computer-readable storage medium from which the one or more processors 402 can read instructions. A computer-readable storage medium can include electronic, optical, magnetic, or other storage devices capable of providing the one or more processors 402 with computer-readable instructions or other program code. Non-limiting examples of a computer-readable storage medium include magnetic disks, memory chips, read-only memory (ROM), RAM, an ASIC, a configured processor, optical storage, or any other medium from which a computer processor can read the instructions.

The comm. interface 408 can be configured to enable the computing system 400 to communicate with various wired or wireless networks and other systems and devices. Networks in which the computing system 400 can communicate with include private networks, public networks, the Internet, and the like. In some implementations, the computing system 400 can use the comm. interface 408 to communicate with one or more databases, cloud-based service provider platforms, servers, machine-learning models, and the like. In some implementations, the computing system 400 can use the comm. interface 408 to distribute processing between the computing system 400 and the one or more databases, cloud-based service provider platforms, servers, machine-learning models, and the like. The comm. interface 408 can facilitate communication using one or more devices such as wireless communication devices, wired communication devices, devices for communicating over local area networks, wide area networks, cellular networks, satellite networks, fiber optic networks, and the like, systems on chips, and other circuitry that enables the computing system 400 to send and receive data.

The user interface 410 can be configured to facilitate user interaction with the computing system 400. The user interface 410 can include one or more display devices for presenting graphical user interfaces, displaying images, videos, and other content. The user interface 410 can also include one or more input devices for receiving input from an end user of the computing system 400 (e.g., touchscreen input). The user interface 410 can also include one or more audio devices for recording sounds from an environment surrounding the computing system and output sounds to the environment.

Although not shown, the computing system 400 can also include other components that provide the computing system 400 with various functionality. Other components can include storage devices, power generating/storing devices, input/output (I/O) components, and the like. The foregoing configurations of the computing system 400 are not intended to be limiting and the computing system 400 can include other subsystems, devices, and components.

The systems and methods of the present disclosure may be implemented using hardware, software, firmware, or a combination thereof and may be implemented in one or more computer systems or other processing systems. Some embodiments of the present disclosure include a system that includes one or more processors and one or more computer-readable media storing instructions which, when executed by the one or more processors, cause the system to perform part or all of the operations and/or methods disclosed herein. Some embodiments of the present disclosure include one or more non-transitory computer-readable media storing instructions which, when executed by one or more processors, cause a system to perform part or all of the operations and/or methods disclosed herein. Some embodiments of the present disclosure include a computer-program product tangibly embodied in a non-transitory machine-readable storage medium, including instructions configured to cause one or more processors to perform part or all of one or more methods and/or part or all of one or more processes disclosed herein.

As used herein, when an action is "based on" something, this means the action is based at least in part on at least a part of the something. As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 6, and 8 percent.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
accessing, from a configuration management database (CMDB) storing a catalogue of applications deployed within an entity, an intake request associated with a process for deploying an application within the entity, wherein the intake request identifies an intake type for the intake request;

applying a rule-based model to the intake request to determine that the intake request includes a valid intake type, a target team, and an initial set of impacted applications;

in response to determining that the intake request includes the valid intake type, the target team, and the initial set of impacted applications, processing the intake request by:
    generating a feature representation of the intake request by extracting structured attributes and vectorized metadata from the intake request and related CMDB records;
    executing a machine-learning model on the feature representation to predict additional impacted applications deployed by the entity, wherein the machine-learning model is executed on a computing platform co-located with the CMDB;
    retrieving a set of historical impacted applications by executing rules that query the CMDB for prior intake requests with the same intake type and returning prior matched applications;
    combining the additional impacted applications and the set of historical impacted applications to produce a consolidated set of results;

inputting the consolidated set of results into a workflow prediction model that is fine-tuned on prior intake-to-deployment mappings to output a set of workflow actions comprising scheduled workflow tasks, resource reservations, and message templates for participants; and automatically updating one or more enterprise tools by programmatically:
    creating or updating a project entry in a project management database with a Gantt chart generated from the scheduled workflow tasks;
    reserving calendar resources via a resource scheduling tool for the scheduled workflow tasks to avoid scheduling conflicts; and
    populating a messaging tool with notification messages and participant lists derived from the message templates, wherein automatically updating the one or more enterprise tools initiate the process for deploying the application.

2. The computer-implemented method of claim 1, further comprising:
updating the rule-based model by deriving a new rule from data and information collected while processing the intake request, and storing the new rule in the CMDB.

3. The computer-implemented method of claim 1, further comprising:
fine-tuning the machine-learning model with labelled training data generated from the intake request and related CMDB records collected during processing so that the workflow prediction model is improved for future intake-to-deployment mappings.

4. The computer-implemented method of claim 1, wherein the machine-learning model comprises a transformer-based model that accepts the feature representation and leverages learned embeddings of application metadata to predict additional impacted applications.

5. The computer-implemented method of claim 1, further comprising:
performing a capacity check by comparing schedule information for currently active projects retrieved from the project management database and resource scheduling tool against the scheduled workflow tasks; and, in response to determining that impacted projects are at capacity, automatically flagging the intake request and modifying the set of workflow actions to include an escalation or rescheduling action.

6. The computer-implemented method of claim 1, further comprising:
enforcing access controls by authenticating a user or system requesting the intake request and by verifying permissions to modify the project management database, resource scheduling tool, and messaging tool prior to automatically updating the one or more enterprise tools.

7. The computer-implemented method of claim 1, wherein the Gannt chart comprises creating one or more visualizations that depict the scheduled workflow tasks, task dependencies, resource assignments, and timeline, and storing the visualizations in the project management database for access by participants.

8. A system comprising:
one or more processors; and
one or more computer-readable media storing instructions which, when executed by the one or more processors, cause the system to perform operations comprising:

accessing, from a configuration management database (CMDB) storing a catalogue of applications deployed within an entity, an intake request associated with a process for deploying an application within the entity, wherein the intake request identifies an intake type for the intake request;

applying a rule-based model to the intake request to determine that the intake request includes a valid intake type, a target team, and an initial set of impacted applications;

in response to determining that the intake request includes the valid intake type, the target team, and the initial set of impacted applications, processing the intake request by:

generating a feature representation of the intake request by extracting structured attributes and vectorized metadata from the intake request and related CMDB records;

executing a machine-learning model on the feature representation to predict additional impacted applications deployed by the entity, wherein the machine-learning model is executed on a computing platform co-located with the CMDB;

retrieving a set of historical impacted applications by executing rules that query the CMDB for prior intake requests with the same intake type and returning prior matched applications;

combining the additional impacted applications and the set of historical impacted applications to produce a consolidated set of results;

inputting the consolidated set of results into a workflow prediction model that is fine-tuned on prior intake-to-deployment mappings to output a set of workflow actions comprising scheduled workflow tasks, resource reservations, and message templates for participants; and automatically updating one or more enterprise tools by programmatically:

creating or updating a project entry in a project management database with a Gantt chart generated from the scheduled workflow tasks;

reserving calendar resources via a resource scheduling tool for the scheduled workflow tasks to avoid scheduling conflicts; and populating a messaging tool with notification messages and participant lists derived from the message templates, wherein automatically updating the one or more enterprise tools initiate the process for deploying the application.

9. The system of claim 8, the operations further comprising:

updating the rule-based model by deriving a new rule from data and information collected while processing the intake request, and storing the new rule in the CMDB.

10. The system of claim 8, the operations further comprising:

fine-tuning the machine-learning model with labelled training data generated from the intake request and related CMDB records collected during processing so that the workflow prediction model is improved for future intake-to-deployment mappings.

11. The system of claim 8, wherein the machine-learning model comprises a transformer-based model that accepts the feature representation and leverages learned embeddings of application metadata to predict additional impacted applications.

12. The system of claim 8, the operations further comprising:

performing a capacity check by comparing schedule information for currently active projects retrieved from the project management database and resource scheduling tool against the scheduled workflow tasks; and, in response to determining that impacted projects are at capacity, automatically flagging the intake request and modifying the set of workflow actions to include an escalation or rescheduling action.

13. The system of claim 8, the operations further comprising:

enforcing access controls by authenticating a user or system requesting the intake request and by verifying permissions to modify the project management database, resource scheduling tool, and messaging tool prior to automatically updating the one or more enterprise tools.

14. The system of claim 8, wherein the Gantt chart comprises creating one or more visualizations that depict the scheduled workflow tasks, task dependencies, resource assignments, and timeline, and storing the visualizations in the project management database for access by participants.

15. One or more non-transitory computer-readable media storing instructions which, when executed by one or more processors, cause a system to perform operations comprising:

accessing, from a configuration management database (CMDB) storing a catalogue of applications deployed within an entity, an intake request associated with a process for deploying an application within the entity, wherein the intake request identifies an intake type for the intake request;

applying a rule-based model to the intake request to determine that the intake request includes a valid intake type, a target team, and an initial set of impacted applications;

in response to determining that the intake request includes the valid intake type, the target team, and the initial set of impacted applications, processing the intake request by:

generating a feature representation of the intake request by extracting structured attributes and vectorized metadata from the intake request and related CMDB records;

executing a machine-learning model on the feature representation to predict additional impacted applications deployed by the entity, wherein the machine-learning model is executed on a computing platform co-located with the CMDB;

retrieving a set of historical impacted applications by executing rules that query the CMDB for prior intake requests with the same intake type and returning prior matched applications;

combining the additional impacted applications and the set of historical impacted applications to produce a consolidated set of results;

inputting the consolidated set of results into a workflow prediction model that is fine-tuned on prior intake-to-deployment mappings to output a set of workflow actions comprising scheduled workflow tasks, resource reservations, and message templates for participants; and automatically updating one or more enterprise tools by programmatically:

creating or updating a project entry in a project
management database with a Gantt chart gener-
ated from the scheduled workflow tasks;
reserving calendar resources via a resource schedul-
ing tool for the scheduled workflow tasks to avoid
scheduling conflicts; and
populating a messaging tool with notification mes-
sages and participant lists derived from the mes-
sage templates, wherein automatically updating
the one or more enterprise tools initiate the pro-
cess for deploying the application.

16. The one or more non-transitory computer-readable
media of claim 15, further comprising:
updating the rule-based model by deriving a new rule
from data and information collected while processing
the intake request, and storing the new rule in the
CMDB.

17. The one or more non-transitory computer-readable
media of claim 15, further comprising:
fine-tuning the machine-learning model with labelled
training data generated from the intake request and
related CMDB records collected during processing so
that the workflow prediction model is improved for
future intake-to-deployment mappings.

18. The one or more non-transitory computer-readable
media of claim 15, wherein the machine-learning model
comprises a transformer-based model that accepts the fea-
ture representation and leverages learned embeddings of
application metadata to predict additional impacted appli-
cations.

19. The one or more non-transitory computer-readable
media of claim 15, the operations further comprising:
performing a capacity check by comparing schedule
information for currently active projects retrieved from
the project management database and resource sched-
uling tool against the scheduled workflow tasks; and, in
response to determining that impacted projects are at
capacity, automatically flagging the intake request and
modifying the set of workflow actions to include an
escalation or rescheduling action.

20. The one or more non-transitory computer-readable
media of claim 15, the operations further comprising:
enforcing access controls by authenticating a user or
system requesting the intake request and by verifying
permissions to modify the project management data-
base, resource scheduling tool, and messaging tool
prior to automatically updating the one or more enter-
prise tools.

* * * * *